July 23, 1940.  S. BRAND  2,209,107

RECORD CONTROLLED PUNCH

Filed Jan. 31, 1939  11 Sheets-Sheet 1

INVENTOR
Samuel Brand
BY
ATTORNEY

July 23, 1940.   S. BRAND   2,209,107
RECORD CONTROLLED PUNCH
Filed Jan. 31, 1939   11 Sheets-Sheet 3

INVENTOR
Samuel Brand
BY
ATTORNEY

July 23, 1940.  S. BRAND  2,209,107
RECORD CONTROLLED PUNCH
Filed Jan. 31, 1939   11 Sheets-Sheet 4
FIG. 6.
FIG. 7.
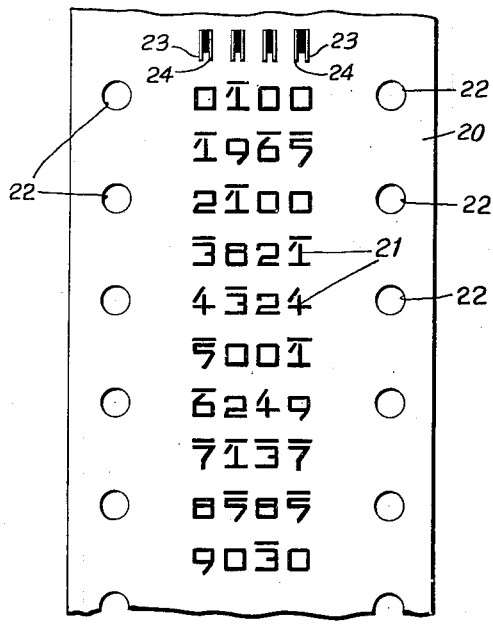
FIG. 8.
| CHARACTER | SEGMENTS |
|---|---|
| 0 | 100,103 |
| 1 | 100,104 |
| 2 | 100,102,103 |
| 3 | 100,101,104 |
| 4 | 100 |
| 5 | 100,101,102 |
| 6 | 100,102,104 |
| 7 | 100,101 |
| 8 | 100,101,103 |
| 9 | 100,102 |
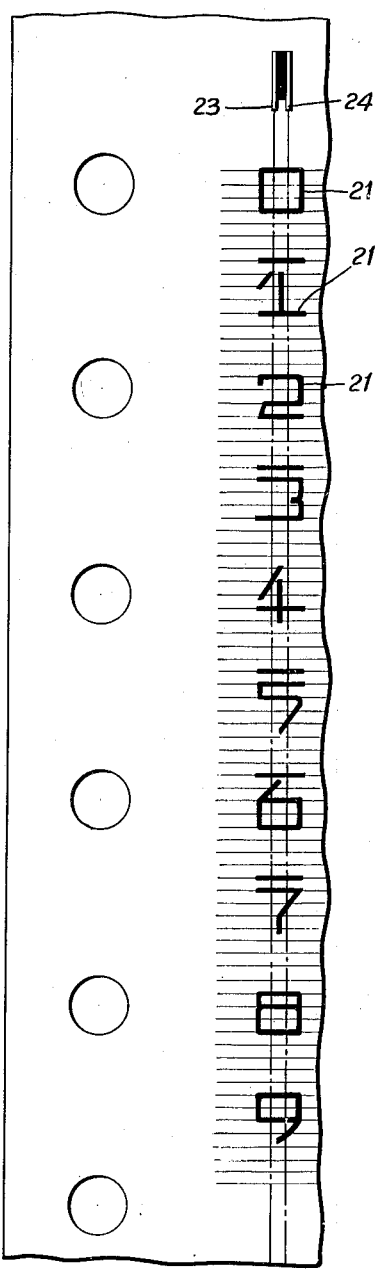
INVENTOR
Samuel Brand
BY
W. M. Wilson
ATTORNEY July 23, 1940.　　　　　S. BRAND　　　　2,209,107
RECORD CONTROLLED PUNCH
Filed Jan. 31, 1939　　　11 Sheets-Sheet 9

INVENTOR
Samuel Brand
BY
*W. M. Wilson*
ATTORNEY

July 23, 1940.  S. BRAND  2,209,107
RECORD CONTROLLED PUNCH
Filed Jan. 31, 1939    11 Sheets-Sheet 10
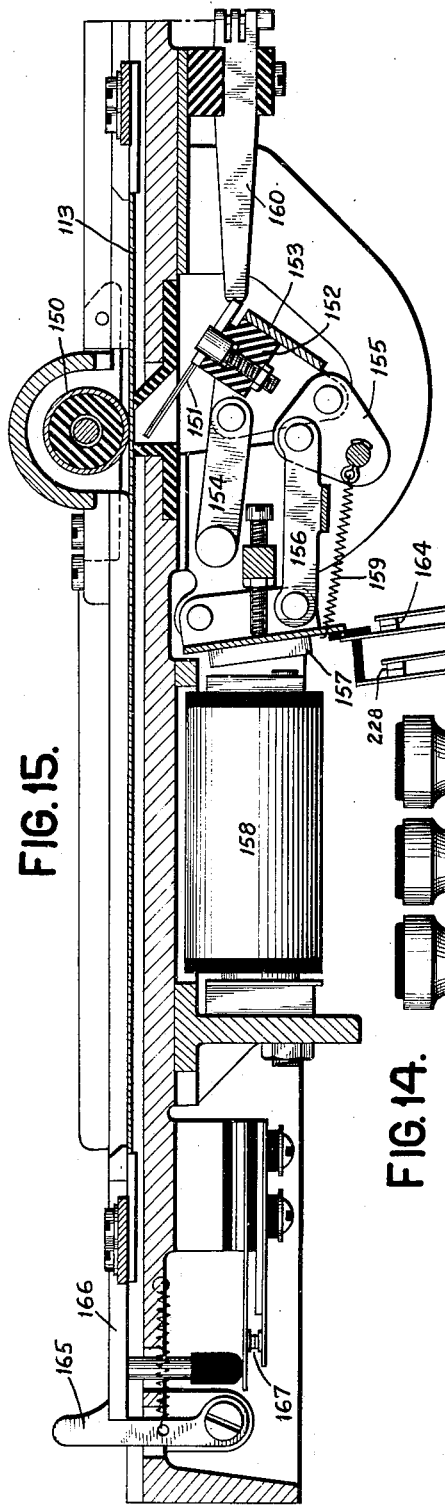
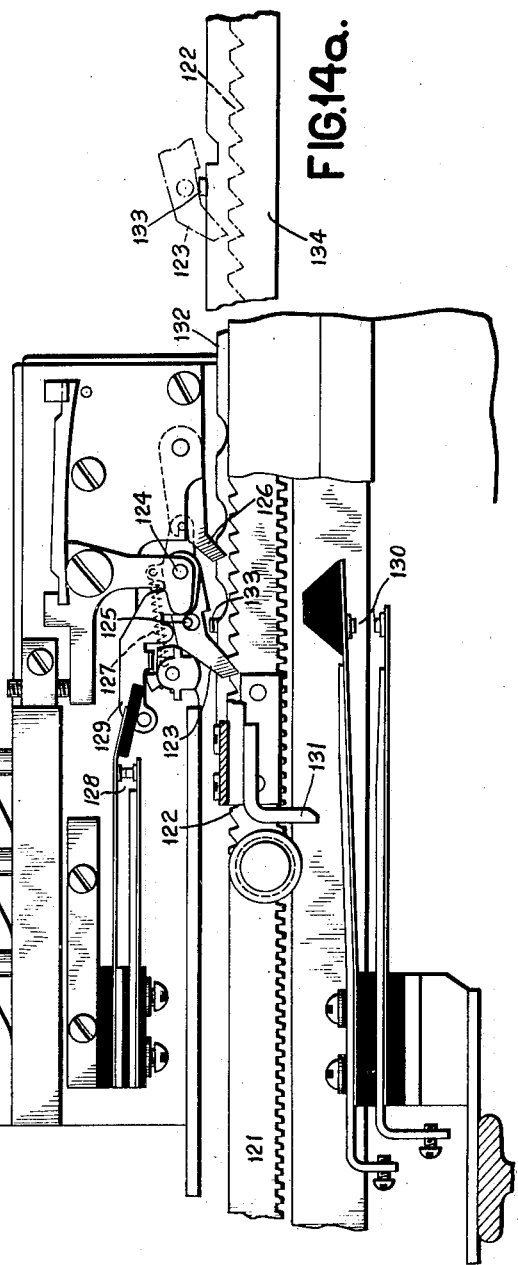
INVENTOR
Samuel Brand
BY
ATTORNEY July 23, 1940.  S. BRAND  2,209,107
RECORD CONTROLLED PUNCH
Filed Jan. 31, 1939   11 Sheets-Sheet 11
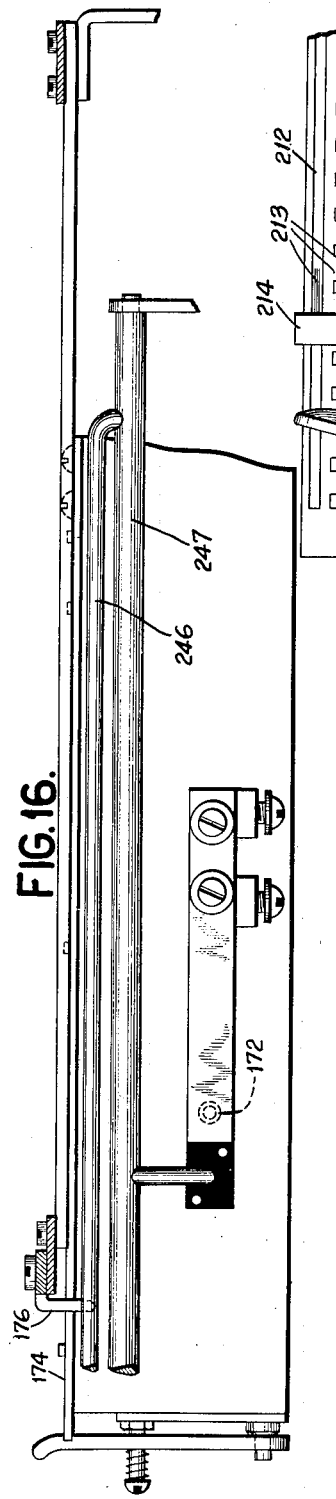
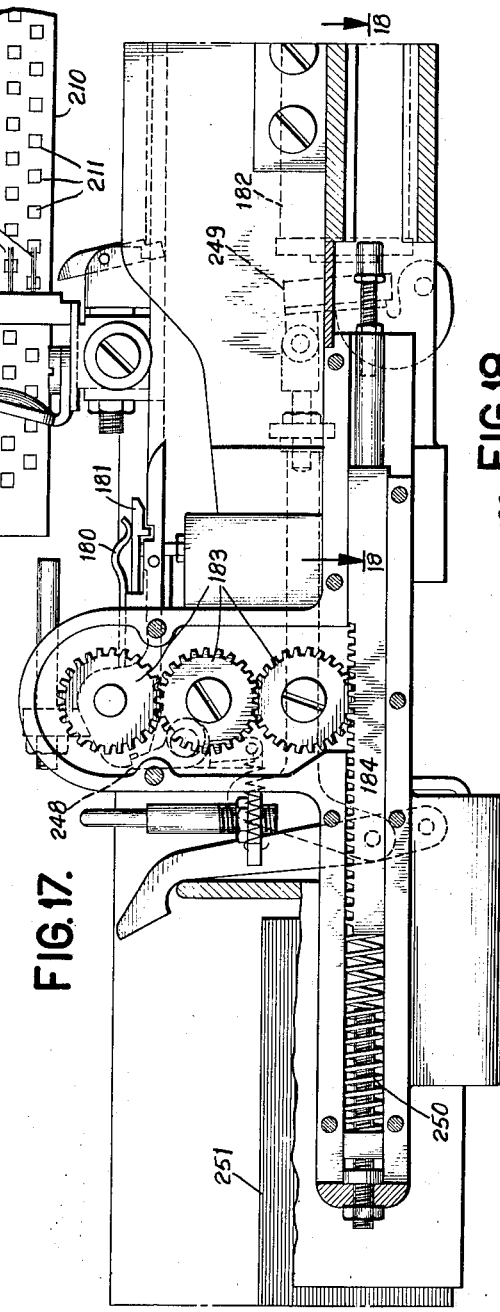
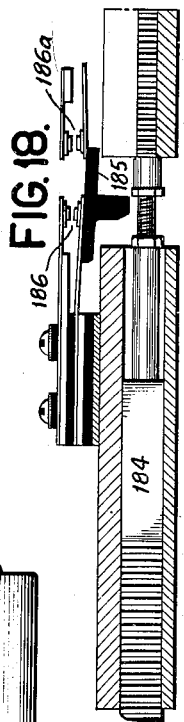
INVENTOR
Samuel Brand
BY
ATTORNEY Patented July 23, 1940

2,209,107

UNITED STATES PATENT OFFICE 2,209,107

RECORD CONTROLLED PUNCH

Samuel Brand, Binghamton, N. Y., assignor to International Business Machines Corporation, New York, N. Y., a corporation of New York Application January 31, 1939, Serial No. 253,820

17 Claims. (Cl. 164—115)

This invention relates to a machine controlled by a record sheet and more particularly to a mechanism for perforating cards according to the values of characters positioned in a plurality of columns on a record sheet.

The present invention contemplates reading of the characters by a device of the general type in my copending application Serial No. 253,819, filed on January 31, 1939.

In the copending application, the characters are each scanned individually and progressively with each of the characters being formed to influence the scanning means at certain times during the scanning thereof in conformity with a code, and means are provided to selectively energize certain work circuits according to the time of influencing of the scanning means.

In the preferred embodiment of the invention which is the basis for the copending application, the characters are described as formed of an electricity conducting substance in a legible variation of conventional shapes. Spaced sensing brushes engage the record sheet which is fed so as to pass by the brushes to permit scanning of the characters progressively from end to end along a straight line. Consequently, the brushes will be electrically interconnected when they simultaneously encounter connected portions of a character. Moreover, each of the characters is formed with index marks positioned along the scanning line for interconnecting the brushes at certain timed intervals during the scanning of the character in conformity with the code. A plurality of work circuits are provided connected through a distributor to a common circuit. An amplifying vacuum tube is in the common circuit and its grid bias is arranged to be changed each time the sensing brushes are interconnected to permit passage of current through the tube. The first brush interconnection by each character causes the distributor to be connected to the feeding means by a one revolution clutch to be operated in timed relation thereto. As a result, the distributor will effect selective energization of the work circuits in accordance with the time of interconnection of the brushes by each character, the distributor being disconnected after the scanning of each character.

As pointed out in said copending application, the characters are so formed with relation to the brush spacing that the brushes will be interconnected only at the coded times even though the characters may be irregularly disposed on the record sheet. This feature is of exceptional value in the present invention as will be obvious as the description proceeds.

The present invention makes use of a record sheet having characters of conductive substance positioned thereon in a plurality of vertical and horizontal columns or if defined with respect to an elongated record sheet, the characters are positioned in a plurality of longitudinal and transverse columns, respectively. A pair of sensing brushes is provided for each vertical column and the sheet is fed vertically or longitudinally when defined with respect to an elongated sheet, to permit simultaneous scanning of all characters in a horizontal column the action being progressive along the longitudinal axis of the sheet. Now the feeding means is connected to a driving motor by a one revolution clutch arranged to halt the feeding means after the scanning of each horizontal column of characters. It will be understood that by vertical feeding of the sheet is meant a feeding along the longitudinal axis of the sheet.

A distributor and an amplifying tube are provided for each pair of sensing brushes, with each distributor being individually connected to the driving motor by a one revolution clutch upon the first interconnection of the corresponding brushes by each character. A set of code storage relays is also provided for each pair of sensing brushes and the relays of each set are selectively energized by the corresponding distributors.

A duplicating punch machine of a well known type is associated with the scanning means and includes a set of punches selectively operated by electromagnets and a carriage for moving a card step by step past the punches. Now each set of storage relays has a plurality of switches operable to select an electromagnet for each of the scanned characters. Then, as the card is moved past the punches, an emitter, operable by the carriage, effects successive energization of the selected magnets. When the carriage reaches the end of its movement, its operates a switch which effects ejection of the card, release of the storage relays, reconnection of the feeding means and restoration of the carriage to move a new card past the punches. During restoration of the carriage, the feeding means permits scanning of the next horizontal column of characters, to set up the storage relays for punching the new card.

It is therefore an object of the present invention to provide a machine controlled by a record sheet having horizontally aligned in a plurality of vertical columns in which the columns are scanned simultaneously step by step with one character in each column being scanned during each step, and means are provided to select one of the machine operating circuits for each scanned character, said selected circuits being energized between steps.

Another object of the invention is to provide a machine of the type described in which storage devices provided for each vertical column are selectively settable during scanning, to in turn control selective energization of machine operating circuits after the simultaneous scanning of a character in each of the vertical columns.

It is another object of the invention to provide a mechanism for simultaneously scanning a character in each of a plurality of vertical columns, to select a punch operating circuit for each scanned character and thereafter to successively energize said selected circuits to punch a card in accordance with the values of those characters.

It is an additional object to provide a mechanism of the type described in which the sheet feeding means is halted after the simultaneous scanning of a character in each column and is restarted after punching of a card, to effect scanning of a new set of characters for controlling the selective punching of a new card.

It is a still further object of the present invention to provide a mechanism of the type described which includes a storage device for each vertical column of characters settable according to the value of the character scanned, means for halting the sheet feeding means after the simultaneous scanning of the characters in each horizontal column, means for thereafter selectively operating the punches under the control of successive storage devices, and means after complete punching for releasing the storage devices and restarting the feeding means.

Further objects of the instant invention reside in any novel feature of construction or operation or novel combination of parts present in the embodiment of the invention described and shown in the accompanying drawings, whether within or without the scope of the appended claims and irrespective of other specific statements as to the scope of the invention contained herein.

In the drawings:

Fig. 6 shows a portion of a record sheet.

Fig. 7 is an enlarged view of a portion of the record sheet.

Fig. 8 is a chart for use with Figs. 6 and 7.

Figure 9:
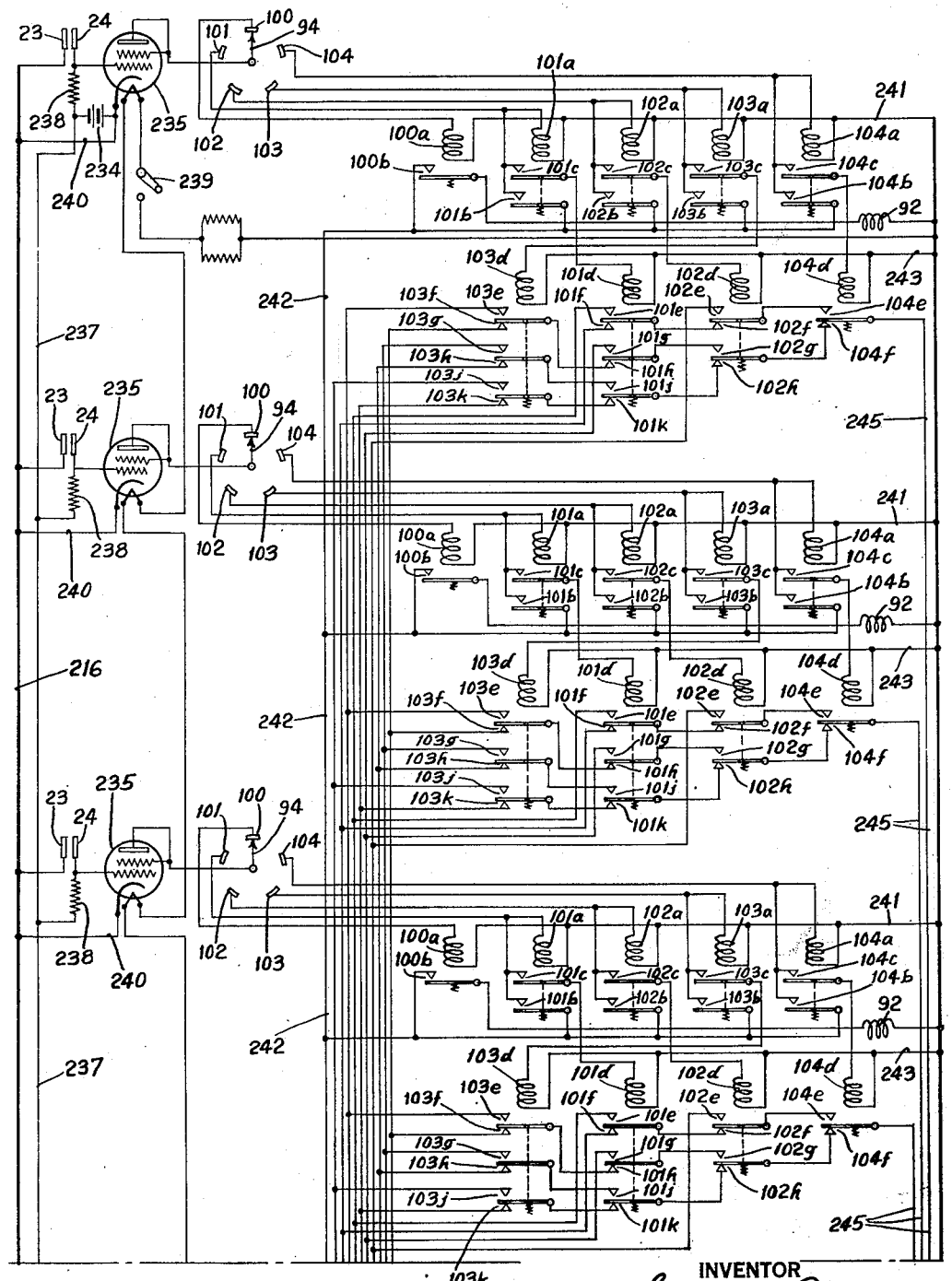
Figure 10:
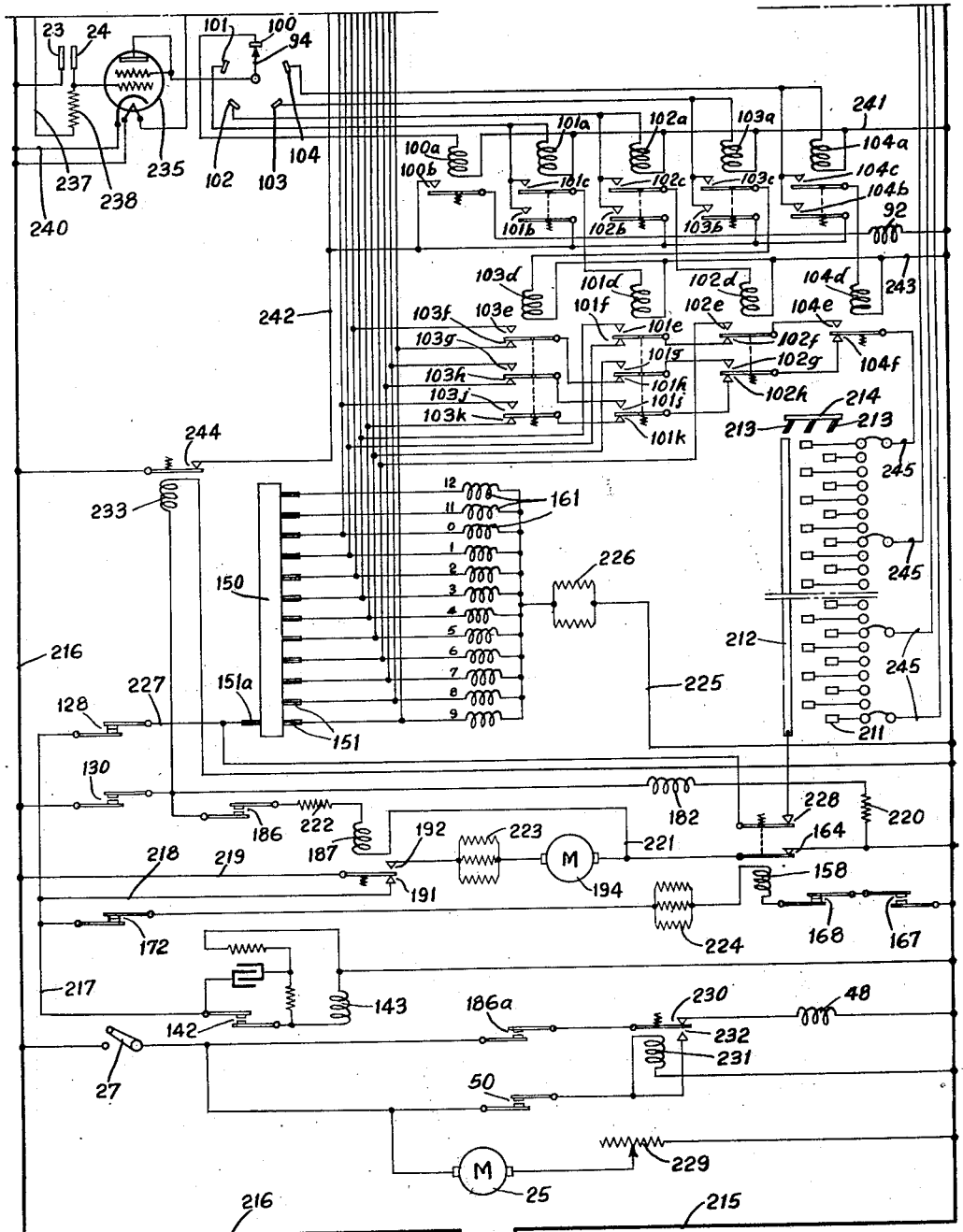

Figs. 9 and 10 form the wiring diagram.

Figure 11:
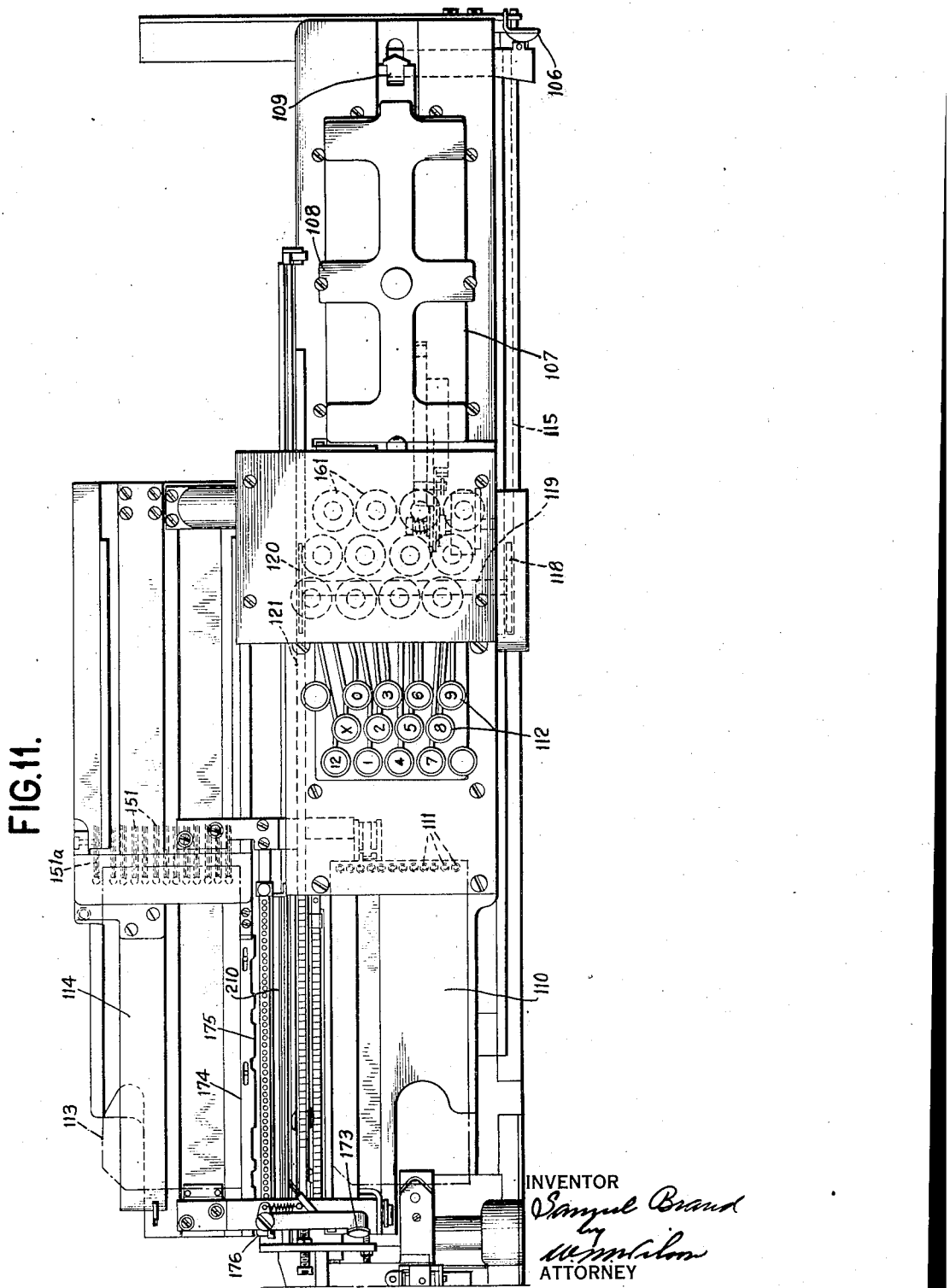

Fig. 11 is a plan view of the punching mechanism.

Figure 12:
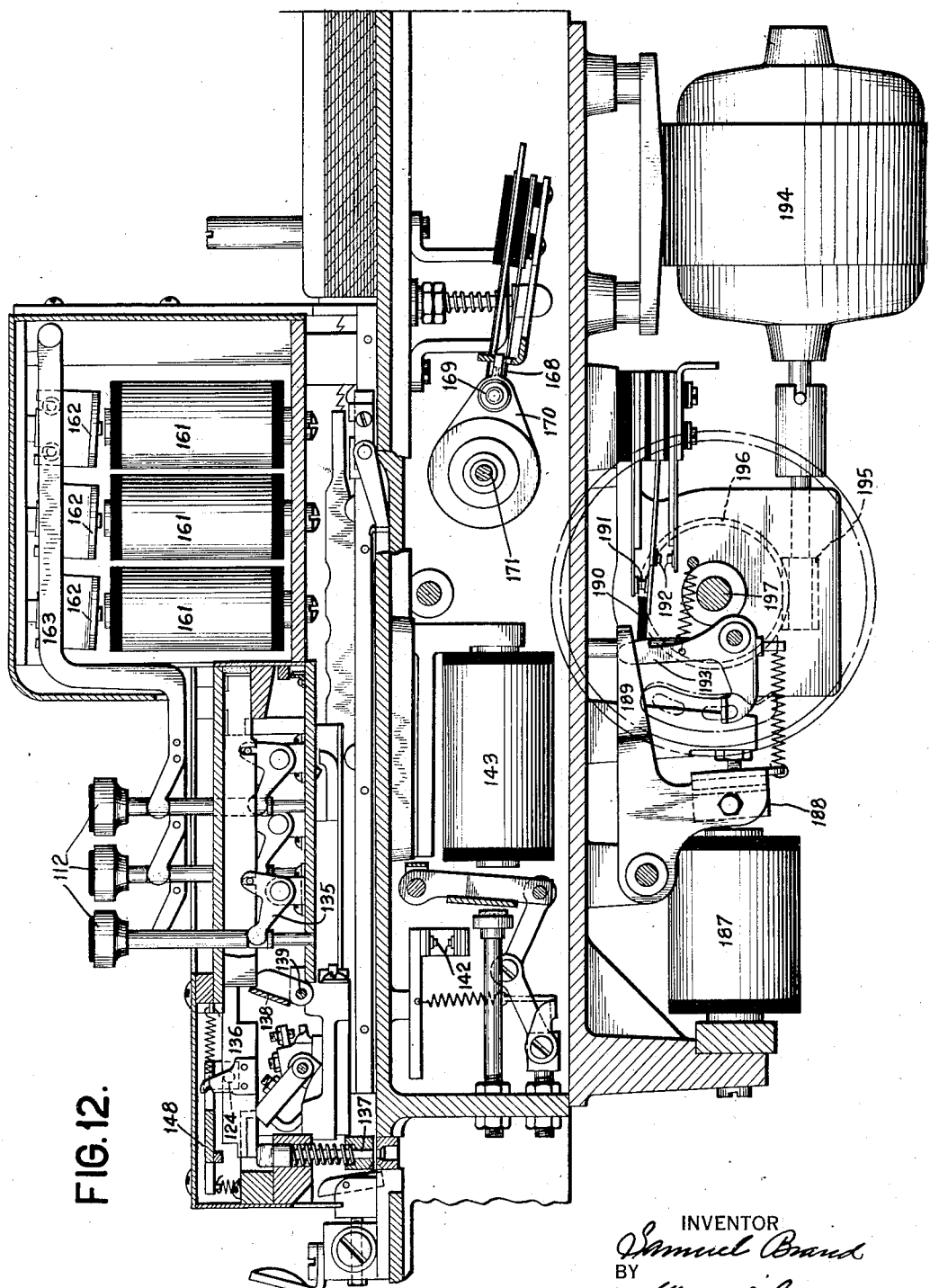

Fig. 12 is a sectional view illustrating details of construction of the punching mechanism.

Figure 13:
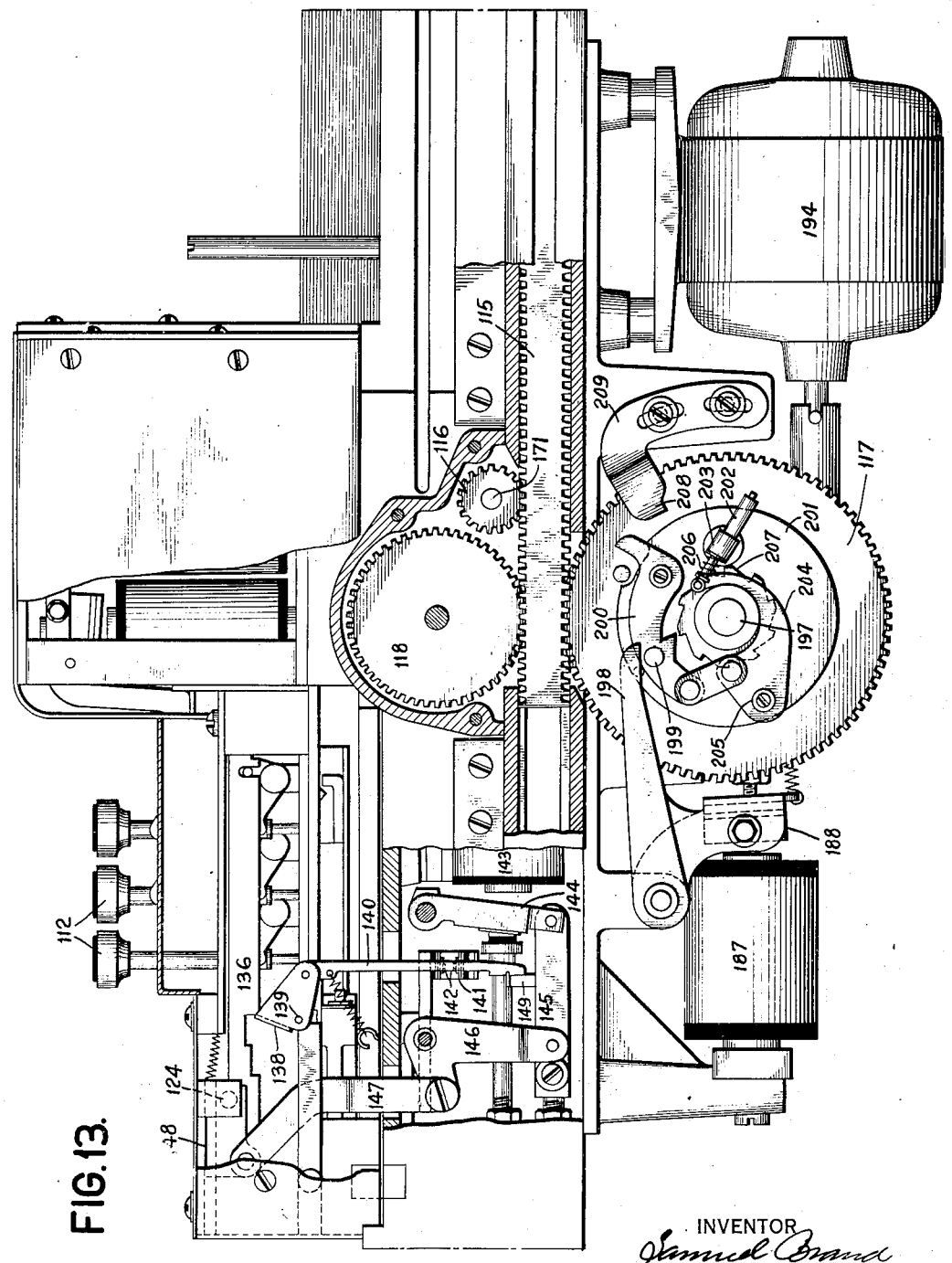

Fig. 13 is a view similar to Fig. 12 but taken on a line further to the front of the mechanism.

Fig. 14 is a view illustrating the details of the carriage escapement mechanism and a contact controlling device.

Fig. 14a is a partial view of an escapement bar.

Fig. 15 is a sectional view showing the duplicating brush shifting and controlling devices.

Fig. 16 is a side elevation showing the mechanism for controlling the contacts which cause shifting of the analyzing brushes.

Fig. 17 is a side elevation of the card ejecting mechanism and the emitter.

Fig. 18 is a detail along line 18—18 of Fig. 17.

In Fig. 6 is shown a record sheet 20 having characters 21 thereon of electricity conductive substance or material, representing the digits 0 through 9. These characters are variations of a conventional shape and may be formed with a typewriter having type of the desired shape and using conductive ink. It will be understood, of course, that other means may be used to form the characters, and other substances may be used to render the characters conductive. It will be noted that the characters are disposed on the sheet in horizontal and vertical columns, having as many horizontal columns as may be desired. The vertical columns are limited to four in number, but it will become apparent later on that the number of vertical columns may be increased. In other words, the characters on the sheet are arranged to indicate a vertical column of four digit numbers.

Along each margin of the record sheet 20 is a series of pin holes 22 for use in feeding the sheet so as to pass by the sensing brushes which are located as shown diagrammatically. There are four pairs of brushes, each pair including spaced wire brushes 23 and 24 arranged to scan each character progressively from top to bottom along a straight line. Upon simultaneous engagement of the brushes of one pair with a connected portion of a character, those brushes will be electrically interconnected. The manner in which such interconnections are converted into current indications for accomplishing work will be pointed out in connection with a duplicating punch mechanism.

Figure 5:
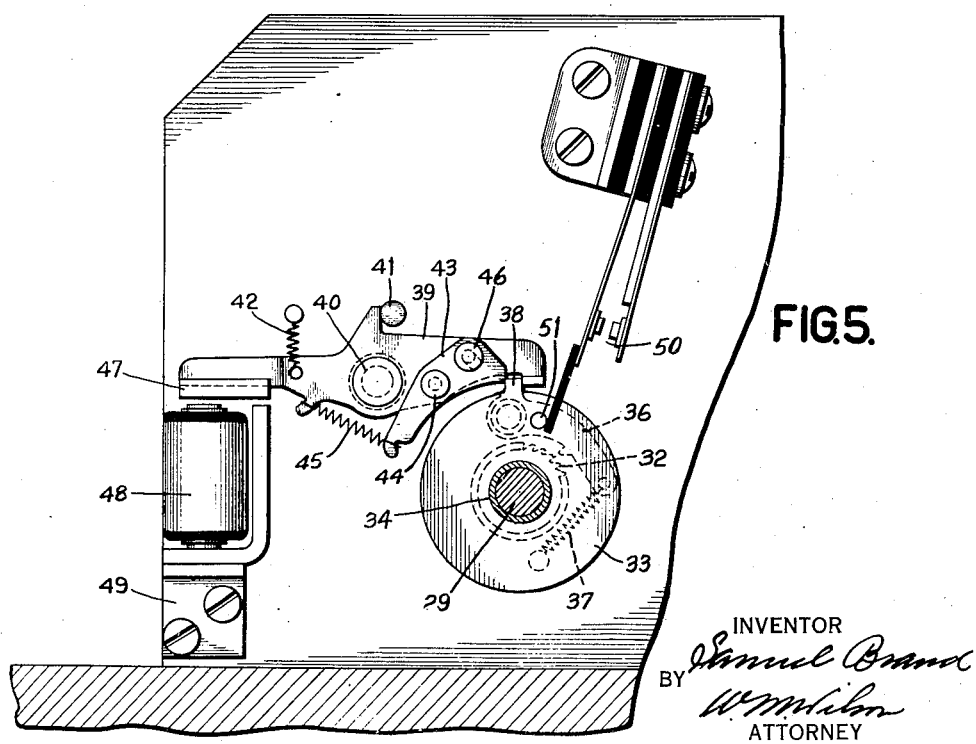
Fig. 5 is a detail of the one revolution clutch as taken along line 5—5 of Fig. 1.

The reading device employing the sensing brushes is shown in Figs. 1 to 5. The electric motor 25 is mounted on a base 26 and is controlled by a manual switch 27. The motor is arranged through gear box 28 to drive shaft 29 which is journaled in frames 30 and 31. The shaft 29 carries a ratchet 32 which forms a part of a single revolution clutch as shown in Fig. 5. This clutch also includes a disc 33 carried adjacent to the ratchet 32 by a sleeve 34 which is mounted loosely on shaft 29 and has a gear 35 (Fig. 1) secured thereto. A pawl 36 is pivotally mounted on disc 33 and biased toward the ratchet 32 by a spring 37 which extends from one end of the pawl to a pin carried by the disc. The other end of the pawl is shaped similarly to tooth 38 formed on the periphery of the disc 33. These two parts, the tooth and the pawl end engage the end of a lever 39 which is pivoted on a stud 40 secured to frame 30 and is biased in a clockwise direction against a stop 41 by spring 42. The position of the pawl 36 on the disc 33 and tooth 38 are such, that when they are disengaged from the lever 39 the end of the pawl is slightly in advance of the tooth 38. Thus, when the tooth and pawl are engaged by the lever, the pawl will be raised to disconnect the disc from the ratchet. A latch member 43 is pivoted at 44 on lever 39 and biased in clockwise direction by spring 45. The motion of the latch member is limited by a guide pin 46 carried by the member and extending through a slot in lever 39. The latch member 43 is in the same plane as the disc 33 and so arranged that the tooth 38 will be latched between the end of the lever 39 and the member 43.

The opposite end of the lever 39 carries an armature 47 for cooperation with a magnet 48 mounted upon bracket 49. Thus when the magnet 48 is energized, the lever 39 will be moved to release the pawl 36 and disc 33 allowing the pawl 36 to engage the ratchet 32 and effect revolution of the disc 33. A switch 50 is positioned to be operated by a pin 51 carried by the disc 33 immediately upon movement thereof. As the disc nears completion of a single revolution the tooth 38 will raise the latch member 43 and the end of the pawl 36 will strike the lever 39. The pawl will then be raised and disconnected from the ratchet just as the tooth strikes the end of the lever at which time the latch member drops into place. Consequently, each time the magnet 48 is energized, the gear 35 will be turned one revolution in a clockwise direction.

A pair of intermediate gears 52 and 53 (Figs. 1 and 3) are secured to a shaft 54 which is journaled in frames 30 and 31. The former gear 52 engages gear 35 to be rotated thereby and gear 53 then drives gear 55 with which it is engaged. Gear 55 is secured to shaft 56, journaled in frames 31 and 57. A feed roll 58 is secured to the shaft 56 between the frames and is provided with a number of pins 59 for co-operation with the pin holes 22 in the record sheet 20.

Figure 1:
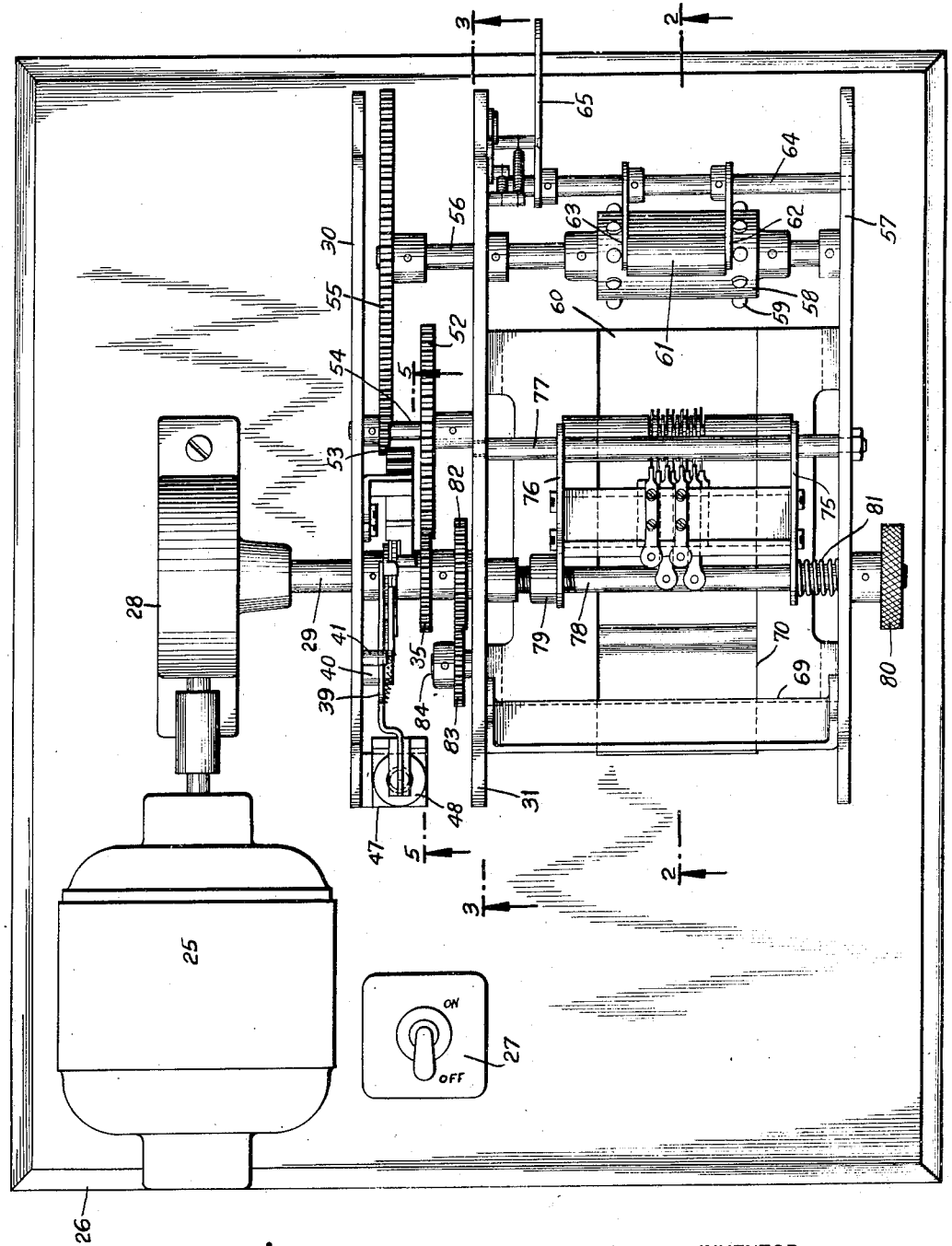
Fig. 1 is a plan view of the reading device.
Figure 2:
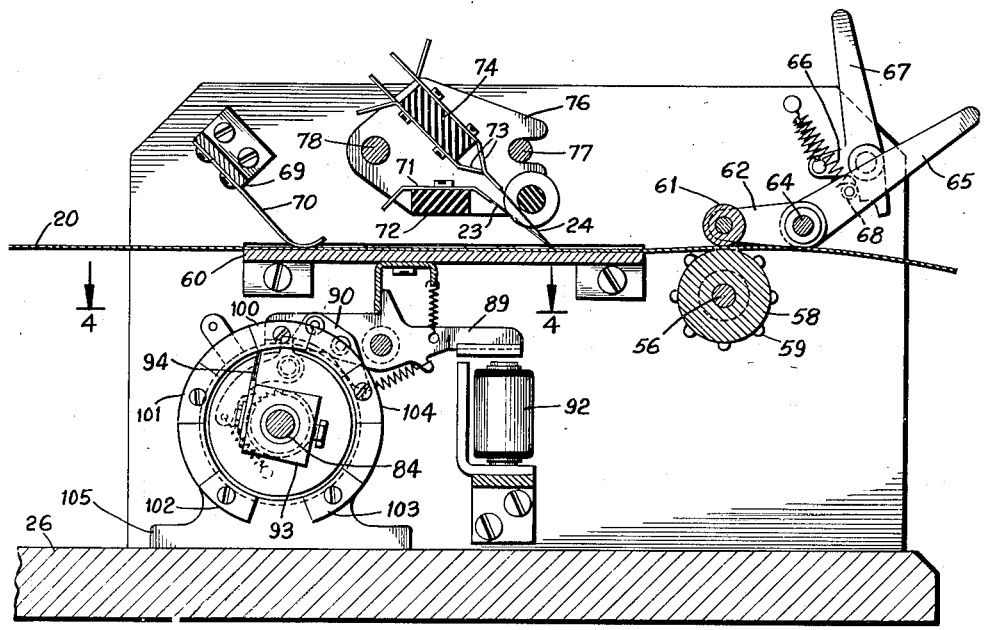
Fig. 2 is a view along line 2—2 of Fig. 1.
Figure 3:
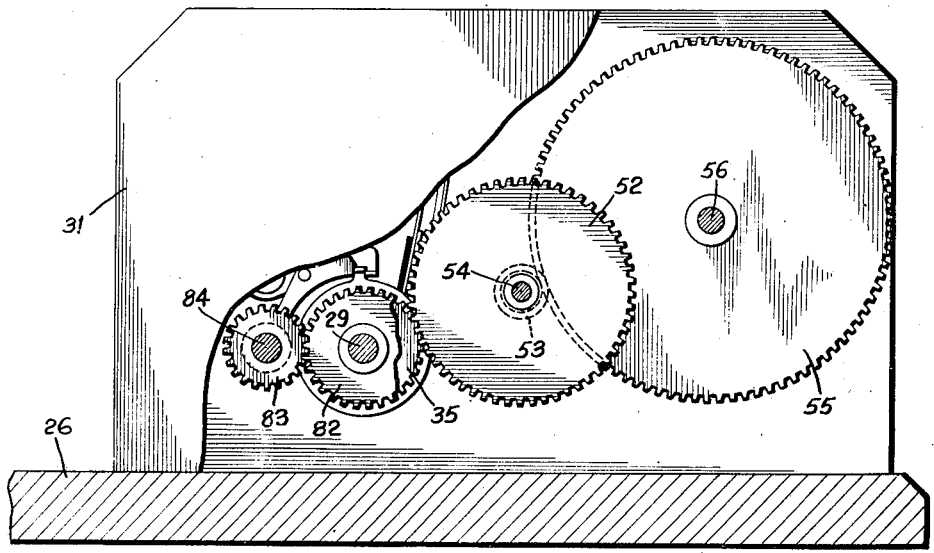
Fig. 3 is a view along line 3—3 of Fig. 1.
Figure 4:
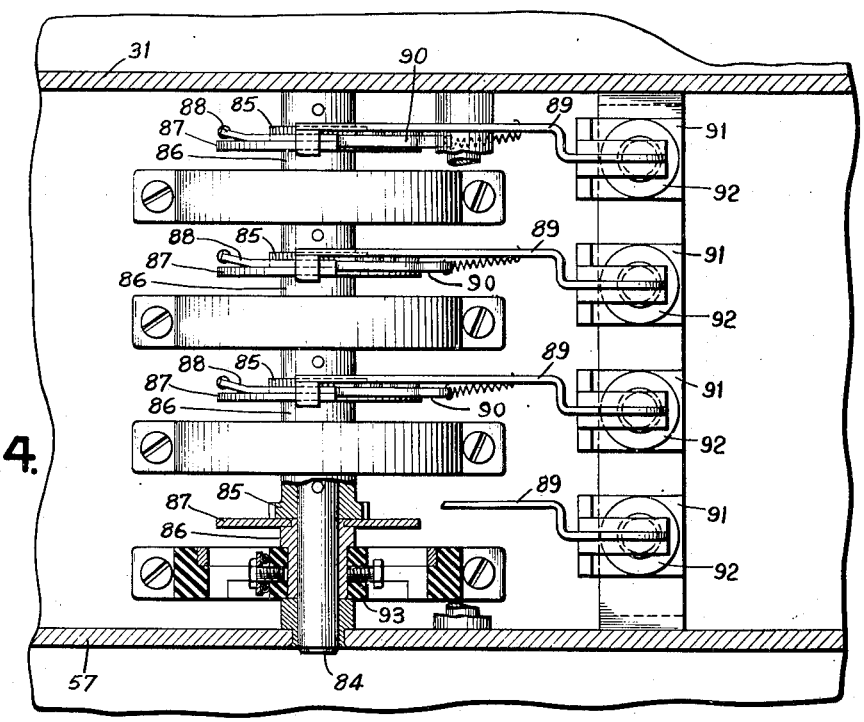
Fig. 4 is a detailed view of the distributors.

The record sheet 20 is arranged to enter the reading device from the left side as viewed in Fig. 2 and to pass over a table 60 mounted between frames 31 and 57. From the table 60 the sheet passes over the feed roll 58 and out of the right side of the device. A pressure roller 61 (Fig. 1 and 2) is rotatably mounted between levers 62 and 63 which are secured to a rod 64 journaled in frames 31 and 57. Another lever 65 is secured to the rod 64 and extends outside of the device to permit manual raising of the roller 61, the lever 65 being normally biased in a counterclockwise direction by spring 66 to hold the pressure roller 61 firmly against the record sheet. A latch lever 67 is pivotally mounted upon frame 31 and biased against a pin 68 carried by the manual lever 65. The end of the latch lever is so shaped that upon manual raising of the pressure roller, the pin 68 will drop into a notch on the latch lever 67 to hold the pressure roller in position to permit a new record sheet to be inserted in the device. An arm 69 also extends between frames 31 and 57 at the left side of the device and carries a leaf spring 70 which acts to hold the record sheet firmly against the table and to cooperate with the feed roller to maintain the record sheet taut.

The brush pairs are mounted above the table 60 so that the brushes will engage the record sheet as it is passed thereover. It will be seen from the wiring diagram that one brush 23 of each pair of brushes will be connected to a common source. These brushes 23 are therefore mounted on a single plate 71 secured to an insulating block 72. The remaining brushes 24 are mounted on individual conducting strips 73 secured to another insulating block 74. The two insulating blocks are in turn mounted between a pair of plates 75 and 76. A rod 77 extending between the frames 31 and 57 supports one end of these plates, and an adjusting shaft 78 journaled in the frames 31 and 57 supports the other side of the plates. This shaft 78 is threaded for cooperation with a nut 79 carried by plate 76 to effect horizontal movement or adjustment of the brushes upon rotation of the shaft 78 by a hand wheel 80. A spring 81 between plate 75 and frame 57 serves to keep the threads tight.

The position of the brushes and the feed roll are so related that when the feed roll clutch is latched, the brushes will be positioned midway between two horizontal columns of characters. The movement of the feed roll is so related to the movement of shaft 29 that one revolution of the shaft will cause the sheet to be moved past the brushes to permit scanning of one horizontal column of characters and halted with the brushes midway between the scanned line and the next horizontal line of characters. In this manner, all four digits in a number are simultaneously scanned progressively from top to bottom along a straight vertical line.

In addition to the ratchet 32, shaft 29 has a gear 82 (Fig. 1) secured thereto. Another gear 83 is mounted on the end of shaft 84 and is in engagement with the gear 82, thereby being constantly driven in a counterclockwise direction. The shaft 84 is journaled in frames 31 and 57 and has four ratchets 85 (Fig. 4) secured thereto forming part of four single revolution clutches. These clutches are similar to the clutch described for driving the sheet feed roll and each one includes a sleeve 86 loosely mounted on the shaft 84, a disc 87, a pawl 88, a lever 89, a latch member 90 and an armature 91 carried by the lever 89. Four electromagnets 92 are also mounted in between frames 31 and 57 and are positioned to cooperate with the armatures 91. Thus, when one of these magnets is energized, the corresponding sleeve 86 will be rotated one revolution in a counterclockwise direction. Secured to each sleeve 86 is an insulated block 93 which in turn carries a distributor brush 94 (Fig. 2). Five distributor segments 100, 101, 102, 103 and 104 are positioned in a circle concentric with the shaft 84 and are arranged to be successively engaged by the brush 94 upon rotation thereof. The segments are insulated from each other by portions of a supporting member 105 which is secured to the base 26. The parts just described are so related to each other that when a distributor clutch is latched the distributor brush 94 will be in contact with segment 100.

As mentioned heretofore, the reading device is electrically connected with a duplicating punch machine to effect punching of a record card in accordance with the values of the characters on the record sheet. A machine suitable for this purpose is shown in Figs. 11 through 18. This machine is old and well known in the art and it is not believed necessary to give a complete detailed description of the construction thereof since it is disclosed in detail in the U. S. Patent No. 1,976,618 issued to Lee and Daly on October 9, 1934. However, a general description of the operation of the punching machine will be given to enable an understanding of its use in the present invention.

Operation of the punching machine is initiated by manual movement of fingerpiece 106 (Fig. 11) to the left which causes a blank card 107 to be fed from hopper 108 by a picker 109 and which also acts through rack 115, gear 118, shaft 119, gear 120 and rack 121 to move carriages 110 and 14 to the right, carriage 110 receiving the blank card from the picker. When the carriages are in their extreme right position (which is the left position in Fig. 14), the pawl 123 will engage teeth 122 of rack 121 to hold the carriage against an actuating spring, with the card in position for punching in the first column by one of the punches indicated generally at 111 (Fig. 11). With each punching operation, shaft 124 (Fig. 14) will be rocked clockwise and then counterclockwise to first effect disengagement of pawl 123 from teeth 122 by shaft actuated pin 125, and the engagement of latch pawl 126 with teeth 122. Spring 127 will then pull pawl 123 to the left on its loose pivot to rest on top of the tooth so that when the counterclockwise movement of the shaft raises pawl 126, the advance of rack 121 will be halted by pawl 123 engaging the next tooth.

Depression of one of the numeral keys 112 (Figs. 11, 12, 13) acts through a bell crank 135 to move the corresponding interposer 136 to the left over the corresponding punch 137. The interposer rocks bail 138 about pivot 139 to raise lever 140 which lifts leaf spring 141 to close contacts 142. Closure of contacts 142 (Fig. 10) completes a circuit from positive line 215 through magnet 143, contacts 142, wires 217 and 218, closed contacts 191 and wire 219 to negative line 216. Magnet 143 thus energized, acts through its armature 144 (Fig. 13), link 145, bell crank 146 and link 147 to rotate plate 148 and its pivot shaft 124. Plate 148 will then engage the displaced interposer to depress its punch and perforate the card. As punching is accomplished, arm 149 on link 145 engages lever 140 to release leaf spring 141 and allow contacts 142 to open, deenergizing magnet 143, the displaced parts then being repositioned by suitable springs.

Keys 112 may be depressed manually or by means of the duplicating mechanism which includes the usual contact roll 150 (Figs. 10 and 15) beneath which a perforated master card 113 is passed by carriage 114 for sensing by twelve brushes 151. The brushes are carried by insulating block 152 mounted on member 153 which is suspended from the frame by link 154 and connected through plate 155 and link 156 to armature 157 of magnet 158. When magnet 158 attracts armature 157, these parts cooperate with spring 159 in a toggle movement to raise the brushes into position engaging the card. Each brush 151 has a sliding contact with a spring 160 which is electrically connected to the coil of one of the magnets 161. When one of the brushes 151 extends through a perforation in the master card to contact roll 150, a circuit is completed from line 215 through wire 225, resistor 226, corresponding magnet 161, brush 151, roll 150, brush 151a, wire 227, contacts 128, wire 218, contacts 191 and wire 219 to line 216. It will be noted that the magnets 161 are also numbered from 0 to 9 and 11 and 12 to indicate the numeral which is represented by the corresponding perforation. Each magnet 161 (Fig. 12) has an armature 162 secured to a lever 163 pivoted at one end and connected to the appropriate key 112, whereby energization of one of magnets 161 will effect operation of a punch. Contacts 128 (Fig. 14) will be broken momentarily by lever 129 actuated by pawl 123 to avoid arcing at the brushes.

In order to effect energization of magnet 158 to raise brushes 151, contacts 167, 168 and 172 must all be closed completing a circuit from line 215 through contacts 167 and 168, magnet 158, resistor 224, contacts 172, wire 218, contacts 191 to line 216. Contacts 167 (Fig. 15) are normally open and are closed only when the duplicating mechanism is to be used and master card door 166 is closed and latched by member 165. Contacts 168 (Fig. 12) are normally closed and are opened by pin 169 on plate 170, which is frictionally connected with shaft 171 rotated by pinion 116, only while the carriages are being moved to the right. Contacts 172 are normally closed but may be opened by action of cams 175 of escapement bar 174 (Figs. 11 and 16). When member 176 carried by lever 173 engages a cam 175, it acts through arm 246 to rock journaled rod 247 and open contacts 172. Lever 173 is movable with the carriages and the cams 175 may be positioned as desired but contacts 172 must always be opened just after the last column is punched.

At the extreme left of the punching machine is the usual card ejector mechanism, Fig. 17, including a pair of gripper jaws 180 and 181 held in the illustrated position by latch 248. Just after punching of the last column, contacts 130 (Fig. 14) are closed by pin 131 to complete a circuit from line 215 through resistor 220, magnet 182 and contacts 130 to line 216. Magnet 182 then acts through its armature 249 (Fig. 17) and associated mechanism to release latch 248. This permits spring 250 to move rack 184 to the right and gears 183 then actuate the jaws 180 and 181 to raise the previously punched card and deposit it upon pile 251. Return of the jaws is accomplished by movement of rack 184 to the left by the end of rack 115 during return of carriage 116.

As rack 184 moves to the right during card ejection, it will engage block 185 (Fig. 18) to close contacts 186 and 186a. Closure of contacts 186 completes a circuit from line 215 through safety contacts 164, wire 221, magnet 187, resistor 222, contacts 186 and 130 to line 216. Magnet 187 (Figs. 12 and 13) will then attract its armature 188 to cause two things to happen. First, arm 189 will engage block 190 to open contacts 191 and close contacts 192, the block being then held by latch 193. Opening of contacts 191 will prevent any punching from occurring and closure of contacts 192 will complete a circuit from line 215 through contacts 164, motor 194, resistor 223, contacts 192 and wire 219 to line 216. The motor will then act through worm 195 and gear 196 to rotate shaft 197. The second action of armature 188 is to lower lever 198 (Fig. 13) against pin 199 carried by pawl 200 pivoted on disc 201. The toggle mechanism, consisting of rod 202 pivoted at 203, lever 204 pivoted at 205, and spring 206 will be moved downwardly by pin 199 effecting engagement of pawl 200 with ratchet 207 which is secured to shaft 197. Since disc 201 is connected with gear 117, the clutch arrangement actuated by magnet 187 will cause gear 117 to be rotated by motor 194 to drive rack 115 and effect return of the carriages to the right. One revolution of gear 117 is sufficient and at the completion thereof, the free end of pawl 200 will strike projection 208 of stationary member 209 shifting the toggle mechanism and disengaging the pawl and ratchet. Latch 193 is also released at this time to open contacts 192 and close contacts 191. Safety contacts 164 (Figs. 15 and 10) are opened during energization of brush magnet 158 to prevent restoration of the carriages until the brushes 151 are lowered and contacts 228 are opened simultaneously with contacts 164.

The usual skip bar 132 of the type described in patent to Schaaff No. 1,426,223 is provided for cooperation with the finger 133. Upon depression of "X" key (Figs. 11 and 14), the tapered finger 133 is moved crosswise of bar 132 to raise the pawl 123 and allow movement of the carriage until the next low spot in the skip bar allows the pawl to be lowered. When the reading device is to be used to control punching, a high skip bar 134 (Fig. 14a) is used which serves to keep the pawl 123 disengaged from rack 121, even though key "X" is not depressed, except at the low points on the bar, which points correspond to the punching positions controlled by the reading device.

An emitter (Figs. 11 and 17) for use when the punches are to be operated by the reading device includes an elongated insulating block 210 secured to the frame of the punching machine and carrying a series of contacts 211 spaced parallel to the line of motion of the carriage. A single conducting strip 212 is also carried by the block 210 and is to be connected with the contacts 211 by interconnected brushes 213 mounted on an insulating member 214, which is movable with the card carriage. The position of contacts 211 is such that they are successively connected to the strip 212 as the carriage moves along step by step.

In order to understand the operation of the punching machine by the reading device, it will be necessary first to carefully examine Fig. 7. As pointed out hereinbefore, characters 21 are electrically conductive and are to be scanned progressively from top to bottom by the horizontally spaced sensing brushes 23 and 24. It will be seen that both the vertical and diagonal bars of the characters are considerably narrower horizontally than the space between the brushes so that the brushes cannot be electrically interconnected by simultaneous engagement with a single vertical bar or a single diagonal bar. Further, those diagonal bars which form an acute angle with a vertical bar are disconnected therefrom (see numerals 1 and 4), to avoid interconnection of the brushes by simultaneous engagement with connected diagonal and vertical bars. It now becomes obvious that these characters are so formed and their configuration is such that only the horizontal bars will interconnect the sensing brushes. Since the horizontal bars or index marks, are considerably wider than the space between the sensing brushes, it becomes apparent that the characters may be irregularly disposed crosswise of the line of scanning, as may occur in a typewritten record, and still effect interconnection of the sensing brushes by each horizontal bar. It is to be understood that the spacing of the brushes 23 and 24 may be even less than shown as long as they will be interconnected only by the horizontal bars.

For purposes of illustration and explanation only, the characters in Fig. 7 have been divided by horizontal lines spaced along the line of motion of the record sheet. It will be recalled that the rotation of the distributor brush and the movement of the sheet have a timed relation since both are driven by the same motor. The space between the horizontal lines in the distance that the sheet will be moved past the sensing brushes in the time that it takes the distributor brush to move from one distributor segment to the next. However, it is to be understood that the distributor brush is not necessarily moved from one segment to the next when the sheet is moved the distance from one horizontal line to the next. It will be explained in connection with the wiring diagram how the first interconnection of the sensing brushes 23 and 24 by a horizontal bar of each character will effect operation of the one revolution clutch resulting in a single revolution of the distributor brush, the size and spacing of the characters allowing a complete revolution before scanning of the next character. In other words, the first horizontal bar of each character will always be encountered by the sensing brushes 23 and 24 while the distributor brush 94 is on segment 100, whereupon the distributor brush will be rotated and after all segments have been contacted thereby, it will be held stationary on segment 100 until the first horizontal bar of the next character is encountered. Examination of the character "0" with regard to the spaced horizontal lines reveals that the sensing brushes will be interconnected while the distributor brush engages segments 100 and 103. Fig. 8 is a chart giving the segments contacted during brush interconnections for each different character. It will be noted that the combination of segments for each character is different from the rest and the combinations set forth in the chart constitute a code.

Returning now to the wiring diagram, Figs. 9 and 10, when punching is to be accomplished according to the record sheet, contacts 167 are left open to insure deenergization of magnet 158 and closure of contacts 164 and 228. Manual closing of switch 27 completes a circuit from line 215 through resistor 229, motor 25, and switch 27 to line 216 to start the motor 25. The carriage may be moved to its left extremity by means of the skip bar and the "X" key. The contacts 130 are then closed effecting ejection of the card and closure of contacts 186 and 186a. The closing of contacts 186 will effect power restoration of the carriage and while this is taking place contacts 186a being closed complete a circuit from line 215 through the feed clutch magnet 48, contacts 230 and 186a and switch 27 to line 216. Such energization of magnet 48 will operate the one revolution feed clutch to move the sheet. It will be recalled that contacts 50 will be momentarily closed immediately upon the operation of the feed clutch. The circuit from line 215 through magnet 231, contacts 50 and switch 27 to line 216 energizes magnet 231 to open contacts 230 deenergizing magnet 48. Magnet 231 also closes contacts 232 creating a holding circuit for the magnet 231 through contacts 186a. Thus, magnet 48 cannot be reenergized until ejection of the next card.

As previously mentioned, all of the brushes 23 of each scanning unit are connected together and to wire 216. A single battery 234 is used for biasing the grids of the amplifying vacuum tubes 235, one of which is provided for each scanning unit. Line 216 is connected by wires 240 to the cathode of each tube and one side of the battery is also connected to the cathode. The other side of the battery is connected by wire 237 to the grid resistor 238 of each tube. The cathode heaters of the tubes are also connected together in series between lines 215 and 216 and controlled by manual switch 239. Now each time a set of brushes 23 and 24 are interconnected by portions of a character 21, a circuit will be completed from one side of battery 234, wire 240, a portion of line 216, the interconnected brushes 23 and 24, through the corresponding resistor 238 to the cathode side of the battery. Consequently, the grid bias of the corresponding tube will be changed allowing current to pass through the tube while the brushes are interconnected.

When the horizontal column of characters are fed past the sensing units, each pair of brushes will scan an individual character. The cathode of each tube is connected to line 216 and the plate is connected to brush 94 of the corresponding distributor. Each of these distributor segments 100, 101, 102, 103 and 104 are connected to line 215 through relays 100a 101a, 102a 103a, and 104a respectively, and wire 241. As previously pointed out, distributor brush 94 will be in contact with segment 100 when the sensing brushes 23 and 24 are first interconnected during the scanning of each character. Energization of relay 100a will result and effect closing of contacts 100b. Ao circuit is then completed from line 215 through magnet 92, contacts 100b, wire 242 and contacts 244 to line 216. When magnet 92 is thus energized, the corresponding one revolution clutch is operated to start rotation of distributor brush 94. Thereafter certain of relays 101a, 102a, 103a and 104a will be energized in accordance with the segment contacted by brush 94 when the sensing brushes 23 and 24 are interconnected by the character being scanned. In other words, the relays will be selectively energized according to the value of the scanned character as set forth by the code.

As one of the relays 101a, 102a, 103a, 104a is energized, it closes the corresponding set of contacts 101b, 102b, 103b. 104b respectively, to complete a holding circuit therefor from line 215 through wire 241, the relay and contacts, and wire 242 to line 216. The corresponding set of contacts 101c, 102c, 103c, 104c are also closed to complete a circuit from line 215 through wire 243, the corresponding one of relays 101d, 102d, 103d, 104d, the closed "c" and "b" contacts, wire 242 and contacts 244 to line 216. Relay 101d is arranged to operate three double throw switches comprising contacts 101e and 101f, 101g and 101h, 101j and 101k, with the 101f, 101h and 101k being normally closed. Relay 102d operates two double throw switches comprising contacts 102e and 102f, and 102g and 102h, with 102f and 102h being normally closed. Relay 103d operates three double throw switches 103e and 103f, 103g and 103h, 103j and 103k with 103f, 103h and 103k being normally closed. Relay 104d operates a double throw switch 104e and 104f with 104f normally closed.

The double throw switches just described are so interconnected with each other and with the punch key operating magnets 161 that the selective energization of the relays will operate the switches to select a magnet to be energized according to the value of the scanned character. Now the scanning of the character by each unit takes place quickly and the storage relays are set up before the carriage is completely restored. Then the carriage moves a card past the punches in steps, the point of stopping of the carriage for punching being controlled by the skip bar, and the emitter acts to effect successive energization of the punch key operating magnets selected by the different scanning units.

The strip 212 of the emitter is connected through contacts 228, wire 227, contacts 128, wires 217 and 218, contacts 191 and wire 219 to line 216. The four double throw switches 104e and 104f, there being one for each unit, are connected respectively to the four contacts 211 located at the desired punching positions by wires 245. Thus, when brushes 213 engage the strip 212 and one of the contacts 211 connected to one of wires 245, the corresponding double throw switch 104e and 104f is connected to line 216. If a "0" has been scanned by that unit, the relays 100a and 103a have been energized, the former starting the distributor and the latter effecting operation of its related switches. A circuit will then be completed from line 216 through the emitter, line 245, contacts 104f, 102h, 101k and 103j to the "0" magnet 161, resistor 226, wire 225 to line 215 causing punching of the card in a position representing "0". If a "1" is scanned, relays 100a and 104a are energized effecting the circuit through contacts 104e, 102f, 101f and the "1" magnet 161. If a "2" is scanned, the circuit is through contacts 104f, 102g, 101h, 103e and the "2" magnet 161. Similarly, a "3" will effect a circuit through 104e, 102f, and 101e; a "4" through 104f, 102h, 101k and 103k; a "5" through 104f, 102g, and 101g; a "6" through 104e and 102e; a "7" through 104f, 102h, 101j and 103h; and "8" through 104f, 102h, 101j and 103g; and a "9" through 104f, 102g, 101h and 103f.

After punching for each unit, contacts 128 will be broken to avoid arcing at the emitter brushes. When all of the selected magnets 161 have been punched, the carriage moves immediately to the end of its movement. At that time, contacts 130 are closed causing energization of a magnet 233 and consequently opening of the contacts 244 and release of the holding circuits for the storage relays. Closing of contacts 130 also effects ejection of the card, restarting of the sheet feeding means to permit simultaneous scanning by each unit of a new character in the next horizontal column of characters, and restoration of the card carriage.

It is possible to use other codes than the one set forth herein as fully explained in the aforementioned copending application. It is also obviously possible by adding scanning units to permit the reading of more than four vertical columns of characters.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine having a plurality of electric circuits for controlling the operation thereof according to the values of characters positioned on a record sheet in a plurality of vertical and horizontal columns, multiple scanning means, means for feeding the sheet vertically whereby all the characters in a horizontal column are scanned simultaneously, each of said characters being itself progressively scanned and formed to influence said scanning means at certain timed intervals during the scanning of that character in conformity with a code, means for halting said feeding means after the scanning of each horizontal column. means responsive to the times at which said scanning means is influenced by each character to select a circuit therefor, means operable after scanning of each horizontal column for energizing said selected circuits, and means operable after said last-mentioned means for restarting said feeding means.

2. In a machine having a plurality of electric circuits for controlling the operation thereof according to the values of characters positioned on a record sheet in a plurality of columns, a scanning unit for each column, means for feeding said sheet step by step to effect simultaneous scanning of a character in each column during each step, each of said characters being formed in aligned portions along a single straight line to influence the corresponding unit at certain intervals during the scanning of that character in conformity with a code, a storage device for each unit, individual means responsive to each unit and including a distributor operating in timed relation to said feeding means for selectively setting the related storage device, and means operable between steps and acting under the control of said storage devices for selectively energizing a circuit for each scanned character.

3. In a machine having a plurality of electric circuits for controlling the operation thereof according to the values of electricity conductive characters positioned on a record sheet in a plurality of vertical and horizontal columns, multiple scanning means including a pair of spaced sensing brushes for each vertical column, means for feeding the sheet vertically step by step, whereby all the characters in a horizontal column are scanned simultaneously during each step, each of said characters being so formed that electrical interconnection of the related brushes will occur only at certain times during the scanning of that character in conformity with a code, means responsive to the time of brush interconnections by each character to select a circuit therefor, and means operable between steps for energizing said selected circuits.

4. In a machine having a plurality of elements effecting operation thereof according to the value of characters positioned in a plurality of columns on a record sheet, multiple scanning means including a scanning unit for each column, driving means for feeding said sheet step by step to effect simultaneous scanning of a character in each column, each of said characters having one or more index marks positioned along a single straight line in accordance with a code for successively influencing its related scanning unit at certain times, individual means responsive to each unit and including means operating in timed relation to the driving means for selecting one of said elements according to the relative times at which said unit is influenced by a character, means associated with each unit and effective upon the influencing thereof by the first mark of a character to initiate operation of the corresponding selecting means and to halt said selecting means after the scanning of each character, and means operable after the scanning of a character in each column to effect operation of the selected element.

5. In a machine having a plurality of electric circuits for controlling the operation thereof according to the values of characters positioned in a plurality of columns on a record sheet, multiple scanning means including a scanning unit for each column, means for feeding the sheet step by step to effect simultaneous scanning of a character in each column during each step, each of said characters having one or more index marks positioned in accordance with a code for successively influencing its related scanning unit, a code storage device for each unit, individual means responsive to each unit and operating in timed relation to said feeding means for selectively setting the related storage device according to the relative times at which said scanning means is influenced by the index marks of a character, means associated with each unit and effective upon the influencing of the unit by the first index mark of each character to initiate operation of the related setting means, and means operable between steps and acting under the control of said storage devices for selectively energizing a circuit for each scanned character.

6. In a machine having a plurality of electric circuits for controlling the operation thereof according to the values of characters positioned on a record sheet in a plurality of columns, a scanning unit for each column, means for feeding said sheet step by step to effect simultaneous scanning of a character in each column during each step, each of said characters having one or more index marks positioned in conformity with a code for successive cooperation at timed intervals with the related scanning unit, a set of storage relays for each unit, a distributor for each unit for effecting selective energization of said relays in accordance with the times of cooperation of the scanning unit and the index marks of a character, means effective upon cooperation of the first index mark of each character and the unit to initiate operation of the related distributor, means for automatically halting each distributor after the scanning of a character by the related unit, means operating between steps and acting under the control of said sets of relays for selectively energizing a circuit for each scanned character, and means operable after said last mentioned means to deenergize said relays.

7. In a machine having a plurality of electric circuits for controlling the operation thereof according to the values of characters positioned on a record sheet in a plurality of vertical and horizontal columns, a scanning unit for each vertical column, means for feeding the sheet vertically step by step to effect simultaneous scanning of all the characters in a horizontal colunm, each of said characters having one or more index marks positioned in conformity with a code for successive cooperation with the related scanning unit at certain times, said feeding means including a motor, a feed roll, and a one cycle clutch interconnecting said motor and roll, said roll being geared so that only one horizontal column is scanned during each cycle; a set of storage relays for each unit, a distributor for each unit for effecting selective energization of said relays in accordance with the times of cooperation of said index marks with the unit, said relays acting to select a control circuit, a one cycle clutch associated with each distributor for connecting it to said motor for operation thereby, means effective upon cooperation of the first index mark of each character and its unit to operate the related distributor clutch, means operable between steps to energize said selected circuits, and means for effecting reengagement of said feeding means clutch after energization of said selected circuits.

8. In a mechanism for perforating cards according to the values of characters printed in a plurality of columns on a record sheet, multiple scanning means, means for feeding the sheet step by step in a single direction only to effect simultaneous scanning of portions of a character aligned along a single straight line in each column by the respective scanning means, a set of punches, a carriage for moving said card step by step past the punches, a plurality of electromagnets, each electromagnet being arranged to effect operation of a different punch, means responsive to said scanning means to select an electromagnet for each of said simultaneously scanned characters, and means operated by said carriage after the scanning of one character in each column for energizing said selected electromagnets successively.

9. In a mechanism for perforating cards according to the values of characters positioned in a plurality of vertical and horizontal columns, multiple scanning means including a scanning unit for each vertical column, means for feeding the sheet vertically step by step in a single direction only to effect simultaneous scanning of all the characters in a horizontal column in portions aligned along a single straight line, different characters having a different influence on said units, a storage device for each scanning unit and settable thereby in accordance with the character scanned, a set of punches, and means operable after the scanning of each horizontal column and acting under the control of successive storage devices for effecting selective operation of said punches.

10. In a mechanism for perforating cards according to the values of characters positioned on a record sheet in a plurality of vertical and horizontal columns, multiple scanning means, means for feeding the sheet vertically to effect simultaneous scanning of all the characters in a horizontal column in portions aligned along a single straight line, driving means, a one revolution clutch for connecting said feeding and driving means, said clutch serving to disconnect said feeding means after the scanning of each horizontal column, a set of punches, a plurality of electric circuits for selectively operating said punches, means responsive to said scanning means to select one of said circuits for each scanned character, means operable after the scanning of each horizontal column for successively energizing said selected circuits, and means operable after the energization of said selected circuits to operate said clutch and reconnect the feeding and driving means.

11. In a mechanism for perforating cards according to the values of characters positioned on a record sheet in a plurality of vertical and horizontal columns, multiple scanning means including a scanning unit for each vertical column, means for feeding the sheet vertically to effect simultaneous scanning of all the characters in a horizontal column, different characters having a different influence on said units, means for halting said feeding means after the scanning of each horizontal column, a storage device for each scanning unit and settable thereby in accordance with the character scanned, a set of punches, means including a carriage for moving a card step by step past the punches after the scanning of each horizontal column, means acting under the control of successive storage devices and including means operable by said carriage at predetermined steps for effecting selective operation of said punches for each scanned character, and means operable after punching for releasing said storage devices and restarting said feeding means.

12. In a mechanism for perforating cards according to the values of characters positioned in a plurality of vertical and horizontal columns on a record sheet, multiple scanning means, means for feeding the sheet to effect simultaneous but individually progressive scanning of all the characters in a horizontal column, each of said characters being formed to influence said scanning means at certain times during the scanning of that character in conformity with a code, means for halting said feeding means after the scanning of each horizontal column, a set of punches, a plurality of electric circuits for selectively operating said punches, individual means responsive to the times at which said scanning means is influenced by each character to select a circuit corresponding to that character, a carriage for moving a card step by step past the punches after the scanning of each horizontal column, means operable by said carriage for successively energizing one of said selected circuits at each step, and second means operable by said carriage to restart said feeding means.

13. In a mechanism for perforating cards according to the values of graphical characters positioned in a plurality of horizontal and vertical columns on a record sheet, multiple scanning means including a scanning unit for each vertical column, means for feeding the sheet vertically step by step in a single direction only to effect simultaneous but individually progressive scanning of all the characters in a horizontal column, each of said characters being formed in portions aligned along a single line only to influence the corresponding unit at certain times during the scanning of that character in conformity with a code, a set of relays for each unit, individual means responsive to each unit and including distributing means operating in timed relation to said feeding means for selectively energizing the corresponding set of relays, a set of punches, a plurality of circuits for operating said punches, a plurality of switches associated with each set of relays and operable thereby to select a punch operating circuit, and means for successively energizing said selected circuits after the scanning of each horizontal column.

14. The invention set forth in claim 10 which also includes means for halting said feeding means after the scanning of each horizontal column, and means operable after the energization of all of said selected circuits for deenergizing said relays and restarting said feeding means.

15. In a mechanism for perforating cards acaccording to the values of characters positioned in a plurality of horizontal and vertical columns, multiple scanning means, means for feeding the sheet vertically to effect simultaneous scanning of all the characters in a horizontal column, means for halting said feeding means after the scanning of each horizontal column, a set of punches, a plurality of electric circuits for selectively operating said punches, means responsive to said scanning means to select one of said circuits for each scanned character, a carriage for moving a card step by step past said punches, means operable by said carriage for successively energizing said selected circuits to effect punching in preselected card columns, a switch operable by said carriage after complete punching for effecting ejection of said card, restarting of said feeding means, restoration of the carriage and positioning of a blank card, said feeding means operating to effect scanning of another horizontal column during carriage restoration.

16. In a mechanism for perforating cards according to the values of characters positioned in a plurality of horizontal and vertical columns on a record sheet, multiple scanning means including a scanning unit for each vertical column, means for feeding the sheet vertically to effect simultaneous, but individually progressive, scanning of all the characters in a horizontal column, each of said characters having one or more index marks positioned in conformity with a code for successively influencing said scanning means, means for halting said feeding means after the scanning of each horizontal column, a set of storage relays for each unit, a distributor for each unit intermittently operated in timed relation to said feeding means for effecting selective energization of said relays in accordance with the relative time of influencing of the scanning unit, means responsive to the influence on each unit of the first index mark of each character scanned thereby for initiating operation of the related distributor, means for halting said distributor after the scanning of a character, a set of punches, a plurality of electromagnets for operating said punches, means under the control of successive sets of relays for selectively energizing an electromagnet for each character in the scanned horizontal column, and means operable after punching for deenergizing said relays and restarting said feeding means.

17. In a mechanism for perforating cards according to the values of characters of electricity conductive substance positioned in a plurality of vertical and horizontal columns on a record sheet, multiple scanning means including a pair of spaced sensing brushes for each vertical column, means for feeding the sheet vertically to effect simultaneous scanning of all the characters in a horizontal column by the related sensing brushes, each of said characters being so formed that electrical interconnection of the related brushes will occur only at certain times during the scanning of that character in conformity with a code, means for halting said feeding means after the scanning of each horizontal column, a set of punches, a plurality of circuits for selectively operating said punches, means responsive to the time of interconnection of each pair of sensing brushes by the character scanned thereby to select a punch operating circuit for each character, a carriage for moving a card step by step past the punches, means operable by said carriage for successively energizing said selected circuits, and second means operable after said last mentioned means for restarting said feeding means.

SAMUEL BRAND.